United States Patent [19]
Bennetto

[11] 3,730,145
[45] May 1, 1973

[54] ROTARY ENGINE

[76] Inventor: Harold H. Bennetto, 10805 Trent Way, La Mesa, Calif. 92041

[22] Filed: Apr. 19, 1971

[21] Appl. No.: 134,963

[52] U.S. Cl. ............123/8.41, 418/68, 418/184, 418/218, 418/255
[51] Int. Cl. ............................................F02b 53/00
[58] Field of Search..................418/68, 211, 217, 418/218, 219, 184, 255; 123/8.41

[56] References Cited

UNITED STATES PATENTS

| | | | |
|---|---|---|---|
| 173,030 | 2/1876 | Lucas | 418/218 X |
| 1,412,296 | 4/1922 | Stowe | 123/8.35 |
| 1,843,409 | 2/1932 | Tyler | 123/8.41 |
| 858,073 | 6/1907 | Kelly | 418/218 |
| 865,891 | 9/1907 | Heberling et al. | 123/8.41 X |
| 1,430,602 | 10/1922 | Sykora | 418/68 X |
| 2,436,285 | 2/1948 | Booth | 418/219 |
| 1,464,408 | 8/1923 | Collier | 418/219 |

FOREIGN PATENTS OR APPLICATIONS

| | | | |
|---|---|---|---|
| 128,784 | 7/1948 | Great Britain | 218/ |
| 163,813 | 5/1921 | Great Britain | 123/8.41 |
| 602,180 | 5/1948 | Great Britain | 418/219 |

*Primary Examiner*—Allan D. Herrmann
*Attorney*—Carl R. Brown and Neil E. Martin

[57] ABSTRACT

A rotary engine having a flywheel-like rotor rotating in a cylindrical chamber in a casing, the rotor having a diametrical slot in which is mounted a vane acting as a piston element. The vane moves with a rocking motion in a cylindrical chamber inclined to and extending on opposite sides of the rotor chamber, the vane chamber having an inlet and outlet, and ignition means positioned so that intake and compression action is taking place on one side of the rotor, while power and exhaust action is taking place on the other side. The engine is adaptable to a variety of fuels and may be ganged in multiple units.

9 Claims, 9 Drawing Figures

Patented May 1, 1973

*INVENTOR.*
HAROLD H. BENNETTO
BY Brown & Martin
ATTORNEYS

ROTARY ENGINE

BACKGROUND OF THE INVENTION

Rotary engines have been designed with a great variety of rotor configurations, often involving interfitting rotors, valves and other moving components which must be precisely synchronized. Except for turbines, which are in a class by themselves and are too costly for many applications, rotary engines are usually unnecessarily complex.

SUMMARY OF THE INVENTION

The rotary engine described herein has, except for bearings, has only two basic moving parts, a drive shaft carrying a flywheel-like rotor and a sliding vane mounted in the rotor. The engine block or casing has a cylindrical chamber in which the rotor is a close rotating fit, and a second cylindrical chamber axially inclined to the rotor chamber to extend on both sides thereof. As the rotor rotates, the vane follows the inclined chamber and thus slides from side to side with a rocking motion, acting as a piston element in the offset portions of the inclined chamber. One offset portion of the vane chamber has an inlet through which a combustible mixture enters and is compressed ahead of the moving vane. At the end of the compression action, the combustible mixture is transferred through a passage to the other offset portion of the vane chamber, in which is ignition means to ignite the mixture. The expanding combustion gases drive the vane to rotate the rotor, the gases ahead of the vane being scavenged through an exhaust outlet.

In the basic form of the engine, no timed valves are necessary, only the ignition being timed. The engine is adaptable to a variety of fuels and several units can be coupled to provide any power necessary. In a multiple unit engine, one or more units can be used for pumping action, either for pressurizing the fuel supply or for auxiliary power take-off.

The primary object of this invention, therefore, is to provide a new and improved rotary engine.

Another object of this invention is to provide a new and improved rotary engine having only two moving parts, a rotor and a vane mounted in the rotor.

Another object of this invention is to provide a new and improved rotary engine in which the vane is guided in a chamber axially offset from the rotor, the vane sliding in the rotor and acting as a piston-like element.

A further object of this invention is to provide a new and improved rotary engine in which all phases of an internal combustion cycle occur simultaneously at different points in the offset chamber.

Other objects and many advantages of this invention will become more apparent upon a reading of the following detailed description and an examination of the drawings wherein like reference numerals designate like parts throughout and in which.

DESCRIPTION OF THE PREFERRED EMBODIMENT

Figure 1:
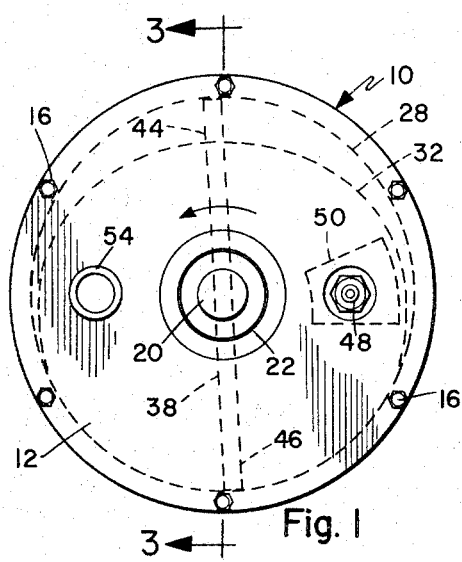
FIG. 1 is an end elevation view of the engine.
Figure 2:
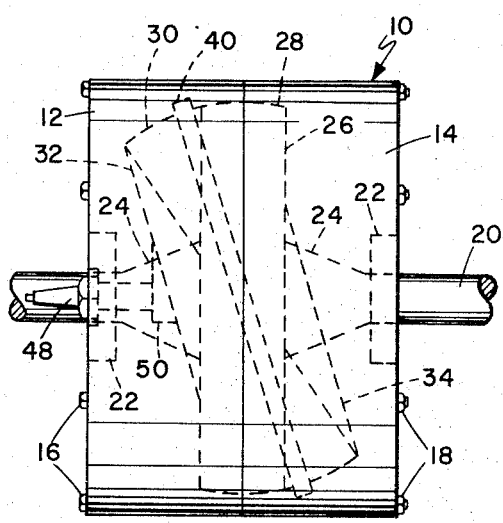
FIG. 2 is a side elevation view thereof.
Figure 5:
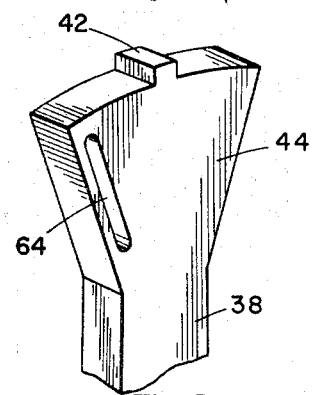
FIG. 5 is a perspective view of one end of the vane.

The engine is contained in a casing 10, illustrated as a simple cylindrical block made in two portions 12 and 14, secured together by bolts 16 and nuts 18. It should be understood that the exact configuration of the casing is not critical, and that portions may be hollowed or inset for lightness, passages provided for cooling and the like. Axially mounted in the casing 10 is a shaft 20 supported in bearings 22, the shaft having enlarged hub portions 24 between which is a cylindrical rotor 26. Casing 10 has a chamber 28 in which the rotor 26 is a close rotating fit, and axially inclined to and integral with chamber 28 is a chamber 30 of similar diameter, the common periphery of the two chambers having a spherical curvature. The offset of chamber 30 results in a pair of arcuate wedge-like chambers 32 and 34, diametrically and axially opposed relative to rotor 26.

Figure 6:
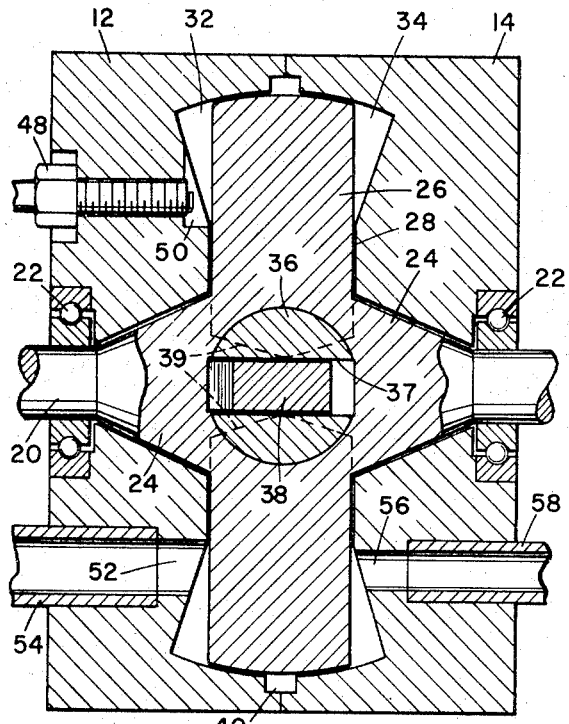
FIG. 6 is a sectional view taken on line 6—6 of FIG. 3.

Diametrically inset in rotor 26 is a rocker cylinder 36 which has a diametrical slot 37 for its full length to hold a flat vane 38. Rocker cylinder 36 is held between inwardly opposed end caps 39 on rotor 26, the caps being cut away, as indicated in broken line in FIG. 6, to provide clearance for the vane motion. The vane can thus twist on the axis of cylinder 36 and rock from side to side through the rotor by sliding in the cylinder with a close fit. Outwardly recessed into the periphery of chamber 30 is a track 40, each end of vane 38 having a non-circular guide pin 42 which rides in the track, to hold the vane perpendicular to the opposed end walls of the chamber as the rotor rotates. As shown, the vane has divergent blades 44 and 46 at opposite ends, the outer ends being wider than the rotor 26.

Figure 3:
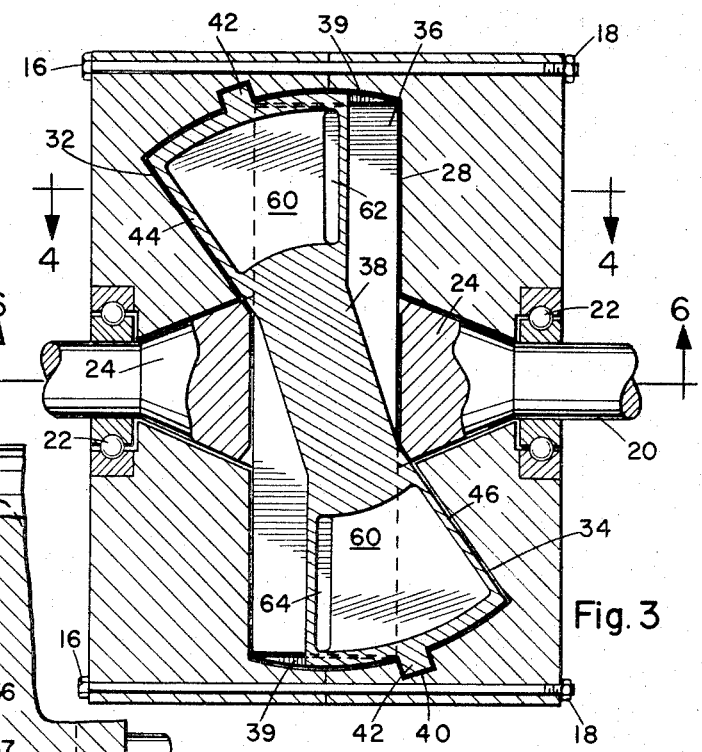
FIG. 3 is an enlarged sectional view taken on line 3—3 of FIG. 1.
Figure 4:
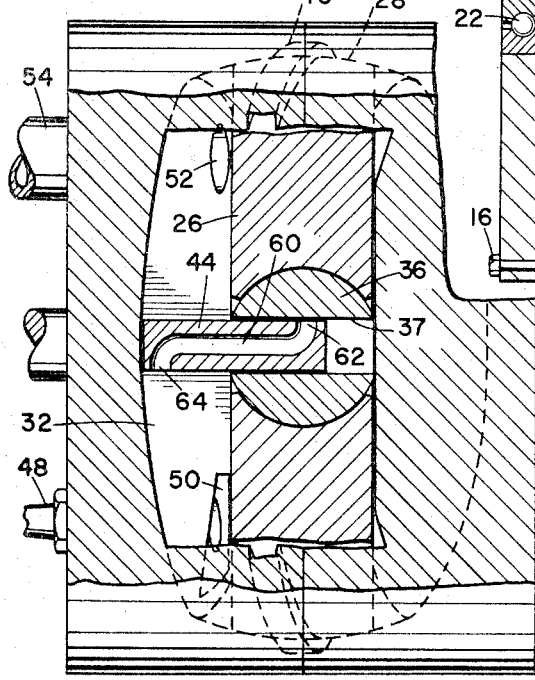
FIG. 4 is a sectional view taken on line 4—4 of FIG. 3.

With a counter-clockwise direction of rotation, as indicated in FIG. 1, a spark plug 48, or similar ignition means, is mounted in casing 10 to extend into a firing cavity 50 in the entry portion of chamber portion 32. At the exit end of chamber portion 32 is an exhaust port 52 with a suitable outlet connection 54. In the entry end of chamber portion 34 is an inlet port 56 connected to a fuel mixture supply coupling 58. Each blade of the vane 38 has a transfer passage 60, extending from an entry port 62 in the leading face of the blade on the side of chamber portion 34 to an exit port 64 in the trailing face of the blade on the side of chamber portion 32. In the extreme offset position of the vane, shown in FIGS. 3 and 4, one end of each transfer passage 60 is closed by the sealed fit of the vane in rocker cylinder 36, while the other end ports are exposed in the respective chamber portions. Due to the divergence of the blades, the wide outer periphery of the chamber 30 has some overlap at the crossover of chamber 28, as can be seen in FIG. 1 and the small wedge openings in FIG. 6. At the crossover position, portions of the entry ports 62 and exit ports 64 will be momentarily exposed simultaneously in opposite chamber portions.

Figure 8:
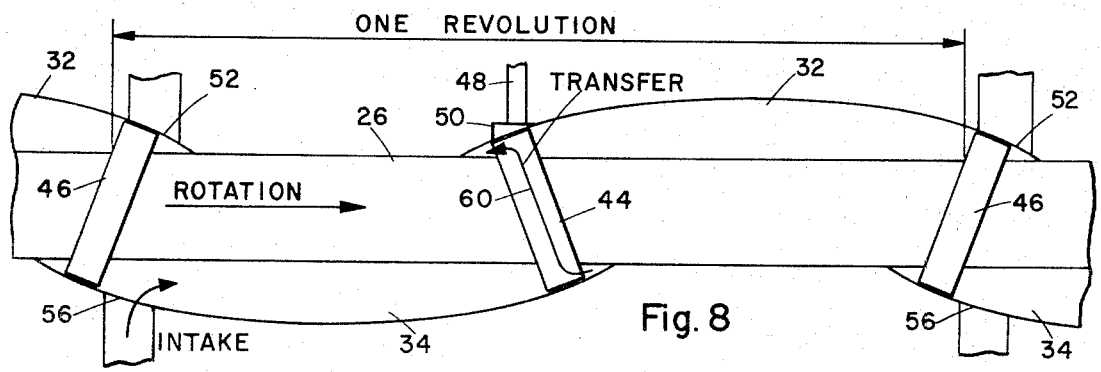
FIG. 8 is a diagram of the engine action as taken circumferentially of the rotor and extended linearly.
Figure 9:
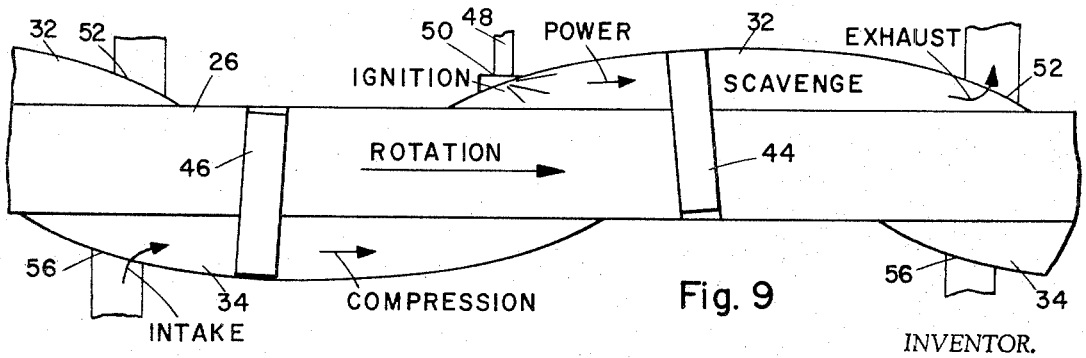
FIG. 9 is similar to FIG. 8 and shows a later phase in the engine action.

The action of the engine is shown in FIGS. 8 and 9, which represent a peripheral section of the engine unrolled into linear diagrammatic form. For clarity, slightly more than one revolution is shown, so that the vane blade 46 actually appears twice in FIG. 8. Starting from the left of FIG. 8, fuel mixture is entering chamber 34 through inlet port 56 ahead of blade 46, which is shown at the crossover between chambers. At the next crossover, blade 44 has compressed a fuel mixture charge, which is transferred through passage 60 to the chamber 32. As blade 44 advances, the spark plug 48 fires and ignites the fuel mixture, as in FIG. 9. At the time of ignition the passage 60 is sealed within the rotor so there is no blow back. The combustion of the fuel mixture drives blade 44 to the right to rotate the rotor, the gases of the previous firing being scavenged through exhaust port 52 ahead of the blade. At the same time the blade 46 is compressing a fuel mixture charge ahead of it in chamber 34 and a fresh charge is being drawn in behind the blade. The cycle is thus continuous, with all phases occurring simultaneously. No synchronized valves are necessary at the intake and exhaust, since the vane acts as both piston and valve. Any suitable timing means may be used for the ignition.

Figure 7:
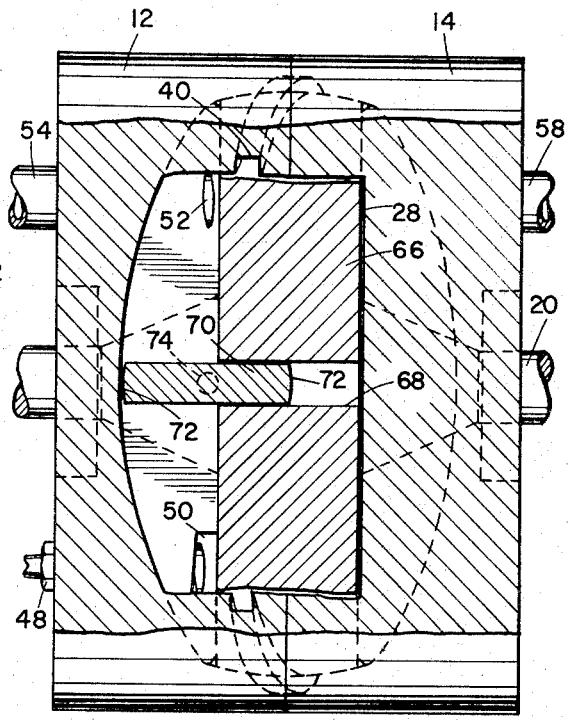
FIG. 7 is a sectional view similar to FIG. 4, but showing an alternative simplified vane mounting.

An alternative structure, shown in FIG. 7, is similar in all respects except for the vane mounting in the rotor, the rocker cylinder being eliminated. The modified rotor 66 has a simple diametrical slot 68, in which the vane 70 is slidable in the plane of the axis of rotation. Since the vane does not rotate to remain perpendicular between the chamber walls, the edges 72 of the vane have a radius with the center at the longitudinal axis of the vane, in order to maintain a seal. Additional sealing means may be used if necessary. Each end of vane 70 has a circular guide pin 74 to ride in track 40 without imparting a turning action to the vane.

Vane 70 may be provided with transfer passages similar to passages 60, or suitable ports or passages may be made through the rotor or the casing to transfer the compressed fuel mixture at the crossover. The size and range of motion of the vane, the precise size and positioning of inlets, outlets and ignition means, and the degree of overlap of the chamber portions at the crossover, will depend on the rotational speed and power required of the engine. When an engine unit is used as a pump in a multiple unit assembly, pressurized air or gas can be tapped from either or both vane chambers at the end of the compression stage.

Having described my invention, I now claim:

1. A rotary engine, comprising:
 a casing having a shaft axially rotatably mounted therein;
 a flywheel-like rotor on said shaft;
 said casing having a cylindrical rotor chamber in which said rotor is a close rotating fit;
 said casing having a vane chamber axially inclined to and integral with said rotor chamber, with diametrically opposed chamber portions extending on opposite sides of the rotor;
 said rotor having a diametrical slot therethrough;
 a vane slidably mounted in said slot;
 guide means in said vane chamber for moving said vane from side to side as the rotor rotates, to maintain sealed sliding contact in said chamber portions;
 one of said chamber portions having a fuel mixture inlet;
 a transfer means for transferring compressed fuel mixture from said one chamber portion to the other chamber portion at the crossover of said vane between chamber portions;
 ignition means in said other chamber portion adjacent said transfer passage;
 an exhaust outlet in said other chamber portion remote from said ignition means,
 and a rocker cylinder mounted diametrically in said rotor for limited rotation about an axis orthogonal to the rotor axis of rotation, said cylinder containing said diametrical slot in which the vane is slidable.

2. A rotary engine according to claim 1, wherein said guide means includes a circumferential track in said vane chamber, said vane having non-circular guide pins riding in said track to guide the vane in sealed sliding contact with the walls of said chamber portions.

3. A rotary engine according to claim 2, wherein said vane has outwardly divergent end blade portions substantially wider than said rotor, said chamber portions overlapping at the crossover with said rotor chamber whereby said blade portions extend into both of said chamber portions at the crossover position.

4. A rotary engine according to claim 3, wherein said transfer means includes a passage through each of said blade portions, each passage having an entry slot in the leading face thereof on the side of said one chamber portion, and an exit slot in the trailing face thereof on the side of said other chamber portion.

5. A rotary engine according to claim 4, wherein the spacing between said entry and exit slots is such that, at least portions of both slots of each passage are exposed in both of said chamber portions simultaneously at the crossover position and that one slot of each passage is sealed within said rotor when the other slot thereof is fully exposed in the respective chamber portion.

6. A rotary engine, comprising:
 a casing having a shaft axially rotatably mounted therein;
 a flywheel-like rotor on said shaft;
 said casing having a cylindrical rotor chamber in which said rotor is a close rotating fit;
 said casing having a vane chamber axially inclined to and integral with said rotor chamber, with diametrically opposed chamber portions extending on opposite sides of the rotor;
 said rotor having a diametrical slot therethrough;
 a continuous true circular track in said vane chamber having an axis at an angle to the axis of rotation of said shaft;
 guide pins on said vane riding in said track to maintain sealed sliding contact in said chamber portions;
 one of said chamber portions having a fuel mixture inlet;
 a transfer means for transferring compressed fuel mixture from said one chamber portion to the other chamber portion at the crossover of said vane between chamber portions;
 ignition means in said other chamber portion adjacent said transfer passage;
 and an exhaust outlet in said other chamber portion remote from said ignition means.

7. A rotary engine according to claim 6, wherein said vane extends through the center of rotation of said flywheel with blades at opposite ends having outwardly divergent sides.

8. A rotary engine according to claim 7, wherein said transfer means includes a transfer passage through each end of said vane, with an entry slot in the leading face of the vane on the side of said one chamber portion, and an exit slot in the trailing face of the vane on the side of said other chamber portion, relative to the direction of rotation.

9. A rotary engine according to claim 7, wherein said vane is slidable substantially in the plane of the axis of rotation of said flywheel.

* * * * *